US007772962B2

(12) United States Patent
Labowicz et al.

(10) Patent No.: US 7,772,962 B2
(45) Date of Patent: Aug. 10, 2010

(54) MULTIPLE LOCK SECURITY SYSTEM FOR CARGO TRAILERS

(76) Inventors: Maciej Labowicz, 785 Larson La., Roselle, IL (US) 60172; Harvey Schmidt, 3051 Scott Crescent, Flossmoor, IL (US) 60422; William P. Lanigan, 10738 Eagle Ridge Dr., Orland Park, IL (US) 60467

( * ) Notice: Subject to any disclaimer, the term of this patent is extended or adjusted under 35 U.S.C. 154(b) by 826 days.

(21) Appl. No.: 11/501,247

(22) Filed: Aug. 2, 2006

(65) Prior Publication Data

US 2008/0061924 A1 Mar. 13, 2008

(51) Int. Cl.
*G06F 7/04* (2006.01)
*B60R 25/00* (2006.01)

(52) U.S. Cl. ......................... 340/5.72; 340/5.5; 340/5.7

(58) Field of Classification Search .................. 340/5.5, 340/5.7
See application file for complete search history.

(56) References Cited

U.S. PATENT DOCUMENTS 3,895,587 A * 7/1975 Bell ............................ 410/26
4,668,008 A * 5/1987 Stinson ....................... 296/155
5,239,779 A * 8/1993 DeLand et al. ................ 49/360
6,016,965 A * 1/2000 Yoshimura et al. ............ 236/35
6,323,565 B1 * 11/2001 Williams et al. ........... 307/10.1
6,335,687 B1 * 1/2002 Terashima et al. ....... 340/573.1
7,667,578 B2 * 2/2010 Watanabe et al. ........ 340/425.5
2003/0093798 A1 * 5/2003 Rogerson ..................... 725/75
2003/0141959 A1 * 7/2003 Keogh et al. ............... 340/5.53
2004/0155477 A1 * 8/2004 Lanigan et al. ................ 296/50
2004/0223275 A1 * 11/2004 Yanagida et al. .............. 361/62
2005/0242919 A1 * 11/2005 Wang et al. ................ 340/3.54
2005/0264024 A1 * 12/2005 Mulder et al. .......... 296/100.07

* cited by examiner

*Primary Examiner*—Benjamin C Lee
*Assistant Examiner*—Andrew Bee

(57) ABSTRACT

A multiple lock cargo security system, comprising: a master security device including position sensors, a motor, a door sensor and a latch; a master controller connected to the position sensors and the door sensor; at least one slave security device having a slave controller connected to the master controller; and a computing device for communicating with the master controller through a wireless communication link, to move the security system locking devices to a locked or unlocked position.

16 Claims, 7 Drawing Sheets

Fig. 6 3-WIRE INTERFACE EXAMPLE

MULTIPLE LOCK SECURITY SYSTEM FOR CARGO TRAILERS

BACKGROUND

This invention relates to a security system for containers having multiple compartments and/or multiple doors.

A need exists for a security system that employs one or more electronic controllers used specifically to control various devices and interfaced with the controlled devices using software unique to the security process employed by those devices, so that it can be used for multiple roll-down doors, swing-out doors, or the combination of both. A need also exists for a multiple door security system that stores a number of information records, such as records concerning the unlocking, locking, opening or closing of each door, such as the date, time, air temperature, and/or geographical location of such event. The records need to be updated in such a way, that the new ones replace the oldest as soon as the maximum number of records allowed is reached. Each electronic control device in the system needs to be able to communicate with each other and work together in one control system.

Furthermore, a need exists for the electronic control system to communicate with an outside world through a unique serial protocol and provide a customer a secure two-way connection using commercially available devices, such as a personal computer (PC), cellular modem, or Internet connection. A need exists for a PC software program to communicate with the electronic controller, update its software, adjust features, enable/disable and program input devices, calibrate, diagnose problems, and retrieve information records. The supplier should be able to control access by issuing software licenses for each electronic control system. The customer should be able to protect access to the security system by setting and maintaining software passwords.

A need further exists for the electronic control system to be able to operate on its own, without external power connected, for a maximum possible time duration, and to maintain its power source by charging it when the outside power is available and controlling which power source is used by the system.

SUMMARY

The disclosed apparatus and methods avoid some of the disadvantages of prior devices that do not employ an electronic control system, and add new features. In one embodiment of the invention, a method is provided for securing from the inside the cargo of a trailer having multiple cargo doors accessible from the outside for closing the container and being movable from an open position to a closed position. The method comprises providing multiple security devices containing latches with screws on the inside of the container, and a linked electronic control system. The electronic control system may be used to operate and control turning of the screws in one direction, thereby moving the latches from the unlocked position to the locked position. It may also be used to operate and control turning of the screws in the direction opposite of the one direction, thereby moving the latches from a locked position to the unlocked position.

In one embodiment of the invention, the method comprises providing a master controller with a control software program that controls the movement of all latches between the unlocked and the locked position, and multiple slave controllers that follow directions from the master controller and provide sensor feedback. The control software program is located in a nonvolatile memory of the master electronic controller. A signal generation device is provided, capable of sending lock, unlock, or other control signals to the master controller (also known as ECU). The ECU software processes the control signals sent from the signal generation device to the controller. The unlock control signal indicates that the multiple security devices should be in the unlocked position, and the lock control signal indicates that the multiple security device should be in the locked position. In order to maximize precision and repeatability of the security system to be able to stop the latches at the same position at any voltage and temperature conditions, a short reverse control signals may also be applied after the main control signals are completed.

In one embodiment, the method also includes storing in nonvolatile memory control data indicative of the most recent control signals sent from the signal generation device to the controller.

In one embodiment, several different sensors could be coupled to the master controller or to the slave controllers. The method includes the control software to process the sensor inputs. Each security device position sensors indicate whether the security device is in the locked or unlocked position. One or more door sensors could be provided, which are also coupled to master or slave controllers. The method includes sensing, with the door sensor, whether each cargo door is in the open or closed position. A door position signal, indicative of whether each door is in the open or closed position, is sent to the master or slave controller. The method includes moving each latch from its unlocked position to its locked position, if the signal generation device sends the lock control signal to the master controller, the security device position signal indicates that the latch is in the unlocked position, and the door position indicates that the door is in the closed position.

The multiple lock security system does not need to have the same number of locks as the number of doors in the container. A single or more doors could be manually locked and separate temperature and/or door sensors could be installed to monitor the door and the cargo compartment status.

In one embodiment, a memory is coupled to the master controller, with the controller activity being sent through the software which allows the memory to be capable of storing control data indicative of the most recent control signal sent from the signal generation device to the master controller. A more detailed explanation of the invention is provided in the following description and claims, and is illustrated in the accompanying drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
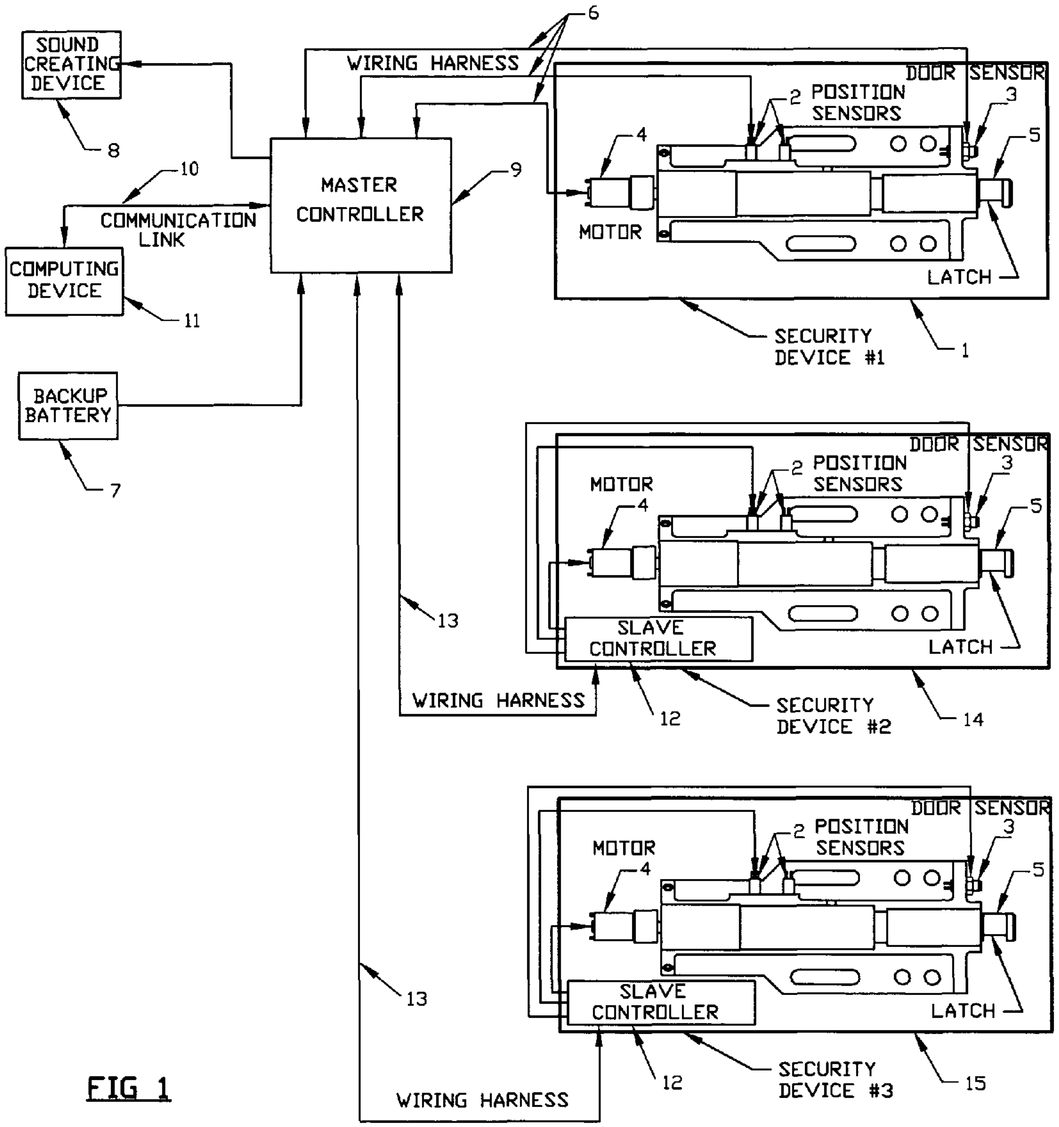
FIG. 1 is a security system drawing showing the security devices and the electronic control system components.
Figure 2:
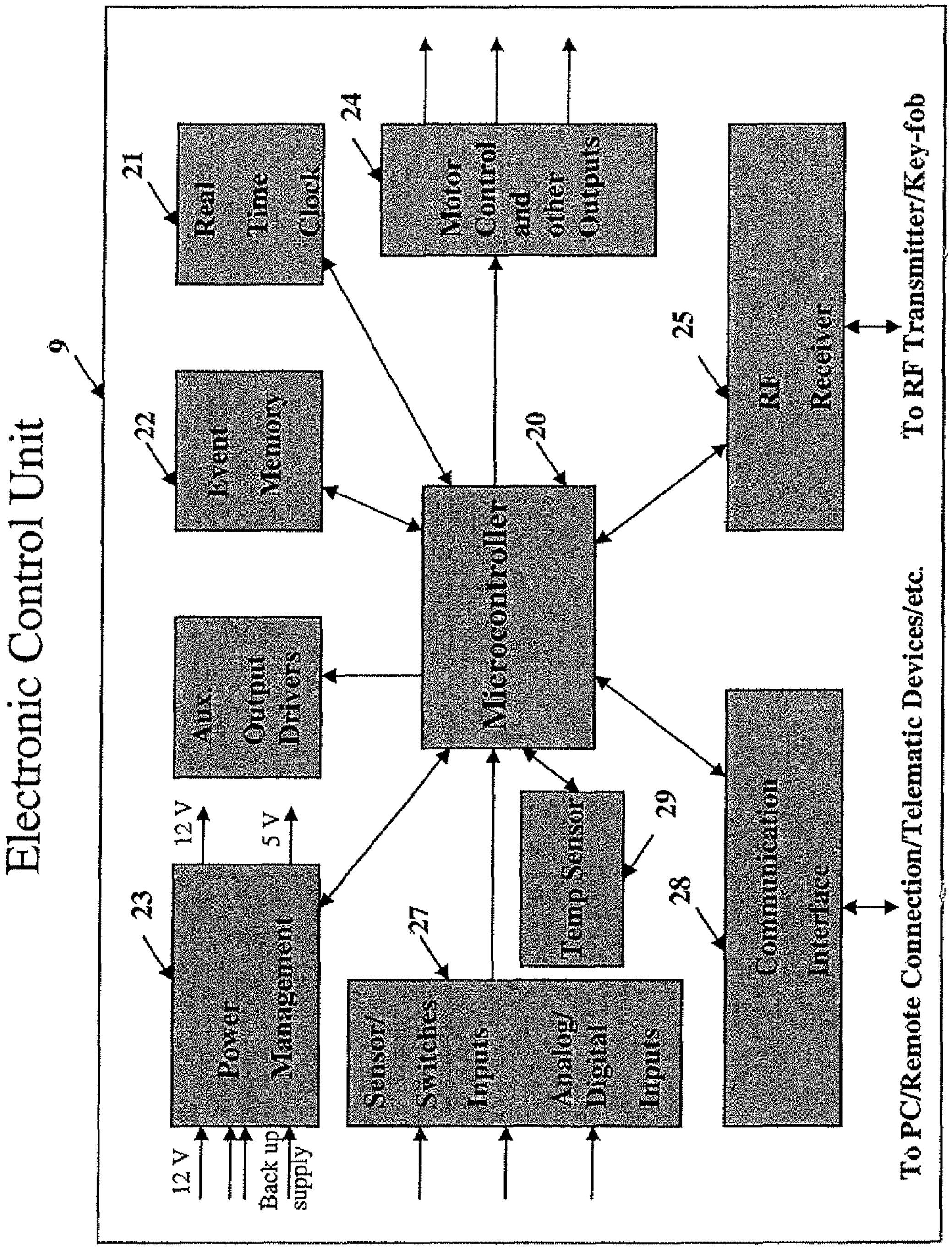
FIG. 2 represents a typical Electronic Control Unit.

Turning now to the drawings, and more particularly, FIG. 1 thereof, there is a typical multiple lock cargo security system comprising a security device 1 (including position sensors 2, a motor 4, and a latch 5), a master controller also known as an electronic control unit (ECU) 9, a main wiring harness 6, a door sensor 3, a backup battery 7, a sound creating device 8, such as a buzzer, and one or more slave security devices 14 and 15, each with a slave controller 12, and a wiring harness 13. This security system also contains a communication link 10 to a computing device 11 (such as a personal computer) for communication, firmware updating, adjusting features, enabling and programming input devices, diagnosing problems, and information records retrieval. FIG. 2 shows typical elements of the ECU, or the Master Controller 9. It usually contains: a microcontroller 20, a real-time clock 21, a power management circuit 23, input and output interfaces 27 and 24, a communication interface 28 (such as RS-232 transceivers), RF receiver 25 (to use with key-fobs), a temperature sensor 29, an external event memory 22.

The Master Controller 9 controls the operation of all security devices (14, 15), making sure that all of them are in positions requested by the controlling software algorithm. In one embodiment, the control software may require the slave security devices (14, 15) to always follow the main security device 1. The Master Controller 9 keeps track of the multiple door positions and sends the appropriate signal for all the locks. In a preferred embodiment, if any of the doors is a swing out type, the door needs to be fully closed before its lock can operate. The electronic control system does not send driving signals to the motor 4, until the door sensor 3 confirms the door closure. Since both the Master Controller 9 and the slave controllers 12, have the door position information available, either one could be programmed to confirm that the door is closed before the motor signal is sent. Any of them can also record the lock position error condition and automatically correct the error condition when the door is closed.

The multiple lock system may use a sound-creating device 8, such as a buzzer, to communicate to a user the current system condition, request acknowledgements, and diagnostic information. In one embodiment, the system utilizes a battery backup 7 to operate all security devices when the main power is disconnected, or not sufficient. The system can be designed to operate from the main power source even if its voltage is lower than the backup battery voltage, to extend the backup battery useful life. The Master Controller 9 is designed to control the charging of the backup battery, if the main power source voltage meets an appropriate threshold. If below a certain threshold, no charging occurs, and if above charging is enabled.

The Master Controller 9 is designed to communicate with a computing device 11, such as a personal computer, a modem, a wireless link, a PDA or the like. In a preferred embodiment, the computing device uses a serial link, such as RS-232, RS-485, USB, or any other available communication link. The user may need to obtain a software license to be able to establish communication between the Master Controller 9 and the computing device 11. A typical PC software communication program and licensing process is described in the U.S. patent application Ser. No. 10/777,876 and is hereby incorporated herein by reference.

The second and third security devices 14 and 15 are designed to function as independent locks, in certain applications, however in a preferred application they follow directions from the Master Controller 9. This provides the advantage of allowing control of multiple locks working in one system. They are usually built with similar components as described with respect to the first security device, such as, they include position sensors 2, a motor 4, a latch 5, and a door sensor 3. Additionally, they use the slave controllers 12 to process position sensor inputs, measure temperature, and to drive the motor 4. Special wiring harnesses 13 are used to exchange information between Master Controller 9 and slave controllers 12. In one embodiment, the special wiring harness includes a three conductor wire for control, feedback, and temperature and door position information, respectively.

Figure 3:
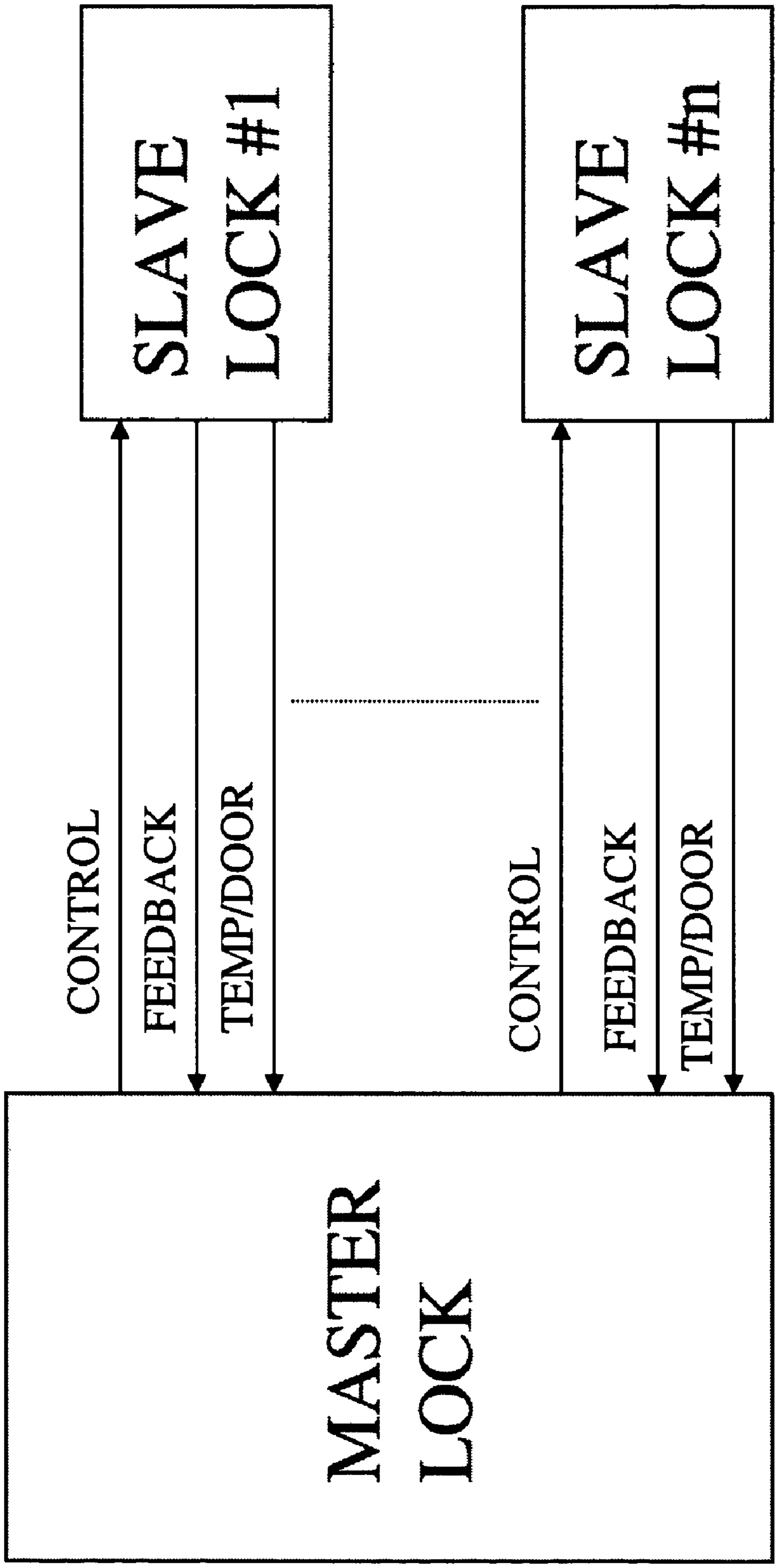
FIG. 3 represents one master lock and several slave locks.
Figure 4:
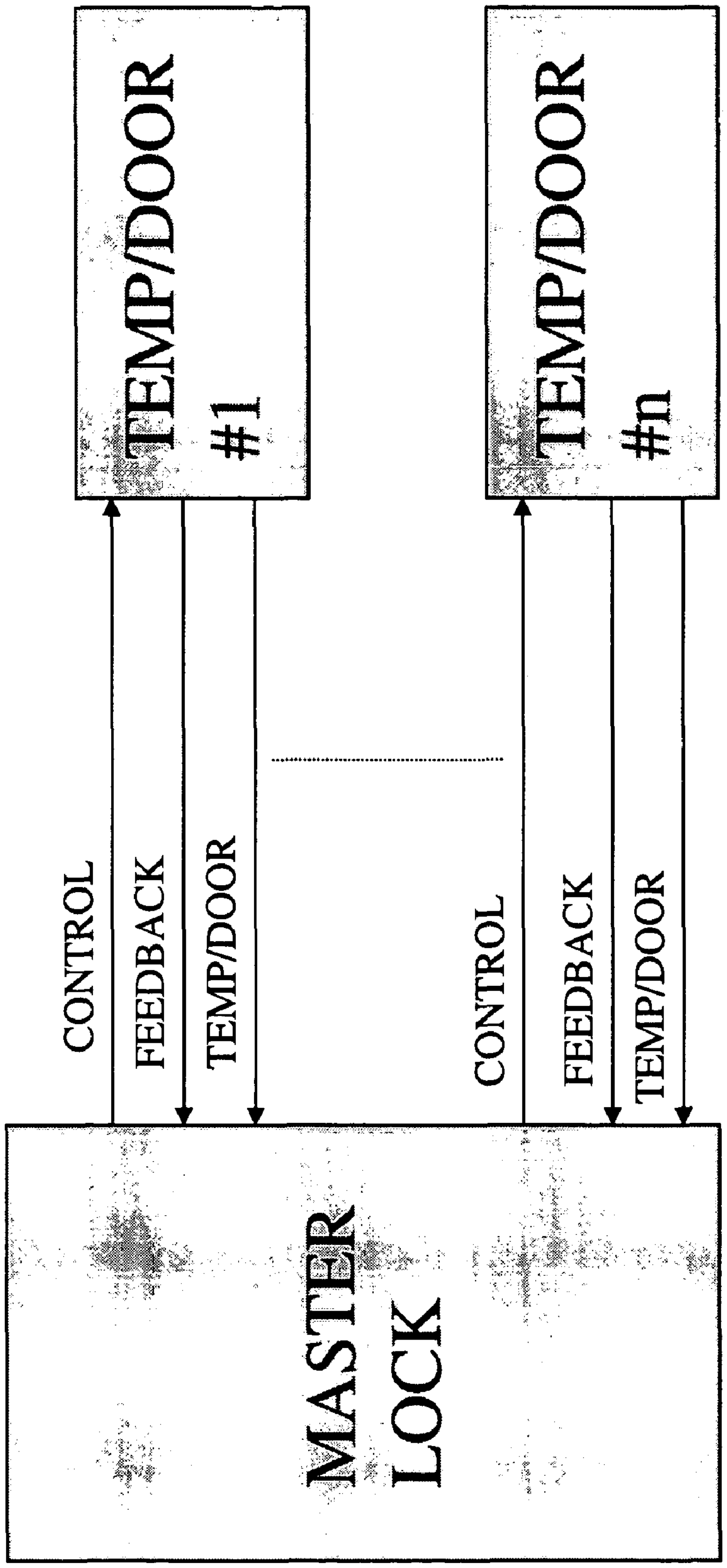
FIG. 4 represents one master lock and several temperature/door sensors without any slave locks.
Figure 5:
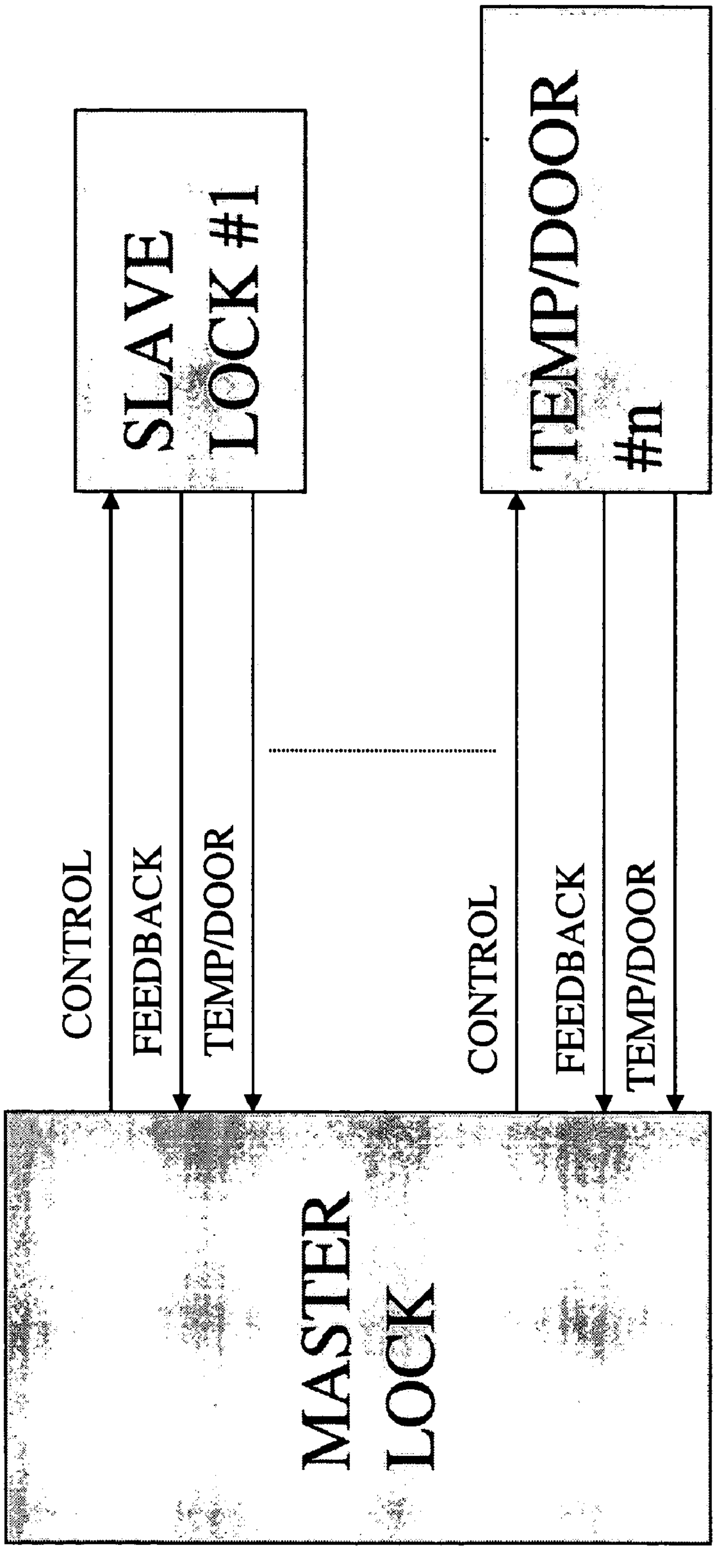
FIG. 5 represents one master and a combination of slave locks and temperature/door sensors.

The multiple lock security system may contain one, two, or more slave locks, or may also contain one or more electronic devices to measure temperature and sense a door position. Examples of different system configurations are shown in FIGS. 3, 4, and 5. In FIG. 5, a customer could only use a master and slave locks for two doors, and a third door could have a temperature and door position monitor, to sense the temperature and record the opening and closing of the door.

Figure 6:
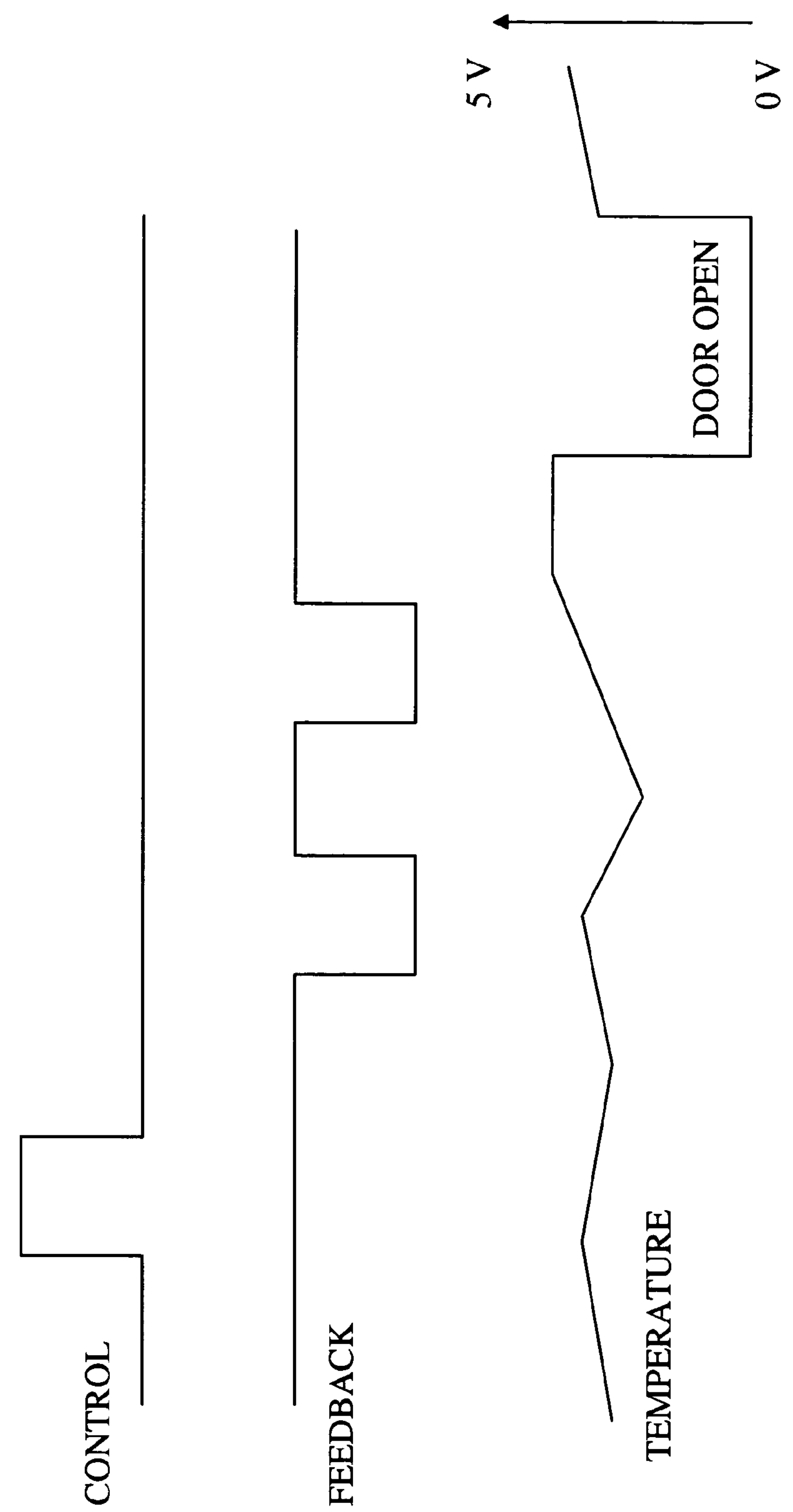
FIG. 6 represents a typical 3-wire interface example.

FIG. 6 shows an example of a typical 3-wire interface used to exchange information between the Master Controller 9 and the slave controllers 12. In use, the Master Controller 9 sends a pulse to activate the slave lock. The slave controller sends the driving signal to the motor 4 to change the lock position from the unlocked to locked, or vice-versa. If the change is successful, the slave controller sends a feedback to the Master Controller 9, typically one pulse to indicate a successful locking and 2 pulses to indicate a successful unlocking. As will be appreciated by those skilled in the art, different numbers of pulses can be sent by either controller on these 2 lines to provide additional means of communication, indicate other events, or error conditions, for example. Timing duration of all these pulses is important for proper communication. In one embodiment, pulses can be one second long with one second break between them.

The third communication line is used to provide the temperature and door position information. In one embodiment, the third communication line is a shared line, with analog voltage between 0 and 5 V proportional to measured temperature value. If this line indicates zero voltage, that means the door is open and the temperature is not measured. Measuring temperature when the door is open may not be accurate, anyway. Once the door is closed, the temperature is again measured, and is designed to be proportional to the voltage.

A control pulse causes an action request, and a feedback signal acknowledges this request and the slave controller acts accordingly. In one embodiment the feedback line can be directly connected to a buzzer, or other sound generating device.

The temperature/door sensor only control module uses the same principle to communicate with the Master Controller 9. The control signal and the feedback line provide different numbers of pulses, to assure that this module is not confused with the slave lock, but the third line works exactly the same, that is, showing the temperature when the door is closed.

The multiple lock system could be calibrated by the Master Controller software to make sure that all temperature sensors read the same temperature prior to shipping and installation in a container. The control software can use any of the sensors for alarm conditions.

The advantage of the three wire interface is that if any wire is broken, the system promptly (within one locking or unlocking cycle) records an error condition. In a stand-alone application of the slave controller 12, a keypad, or an RF receiver is connected to the control line, and the feedback line is connected to a buzzer, or a warning light. In this case, a pulse from a keypad initiates a lock position change, and a buzzer may sound to confirm the successful completion.

In one embodiment, the slave controller is fully integrated with the security device to physically protect the electronics and minimize the potential of failure due to broken wires. In order to improve its reliability even further, a short locking pulse can be generated by the slave controller before each unlocking motor drive signal. This action helps in clearing any debris or ice accumulated in the latch area, and aids in a successful unlocking process. In a preferred embodiment, the short pulse helps to clear debris or ice by jarring and moving the ice or debris, to allow the latch to complete its later movement, only when moving from the locked to unlocked positions. As should be understood by those skilled in the art, the duration of the pulse can vary, and in a preferred embodiment the pulse can range in duration from 100 msec to one second. In more detail, since the temperature is being measured in a preferred embodiment, a longer pulse can be created if below freezing. For example, if below freezing it is more likely that there could be ice formation around the aperature (header retaining hole) through which the latch traverses.

Although any contamination appears less likely to occur in an unlocked position, the slave controller can also generate a short unlocking pulse before sending a full duration locking signal. That will clear any debris affecting the lock in the unlocked position.

The slave lock is designed to operate if one or both position sensors fail and the control signal is sent by the Master Controller 9. Sensors can fail shorted or open. If the lock position sensor fails, the unlocking still works normally with the appropriate feedback provided. Locking, however does not work properly. In case of the sensor failing open, the latch will not stop at the right spot, and no feedback is provided. In case of the shorted sensor, the latch will stay in an unlocked position, because the controller sees it already locked. Because there is no feedback, the Master Controller will record an error condition and will try to correct it by sending another request to lock. After a pre-programmed number of attempts to lock, the slave controller recognizes the failure and sends a five second locking pulse if the lock sensor is shorted, and sends the appropriate feedback to the Master Controller. A similar process occurs, in case of the unlocking sensor failure. In this case, the locking process works correctly, but unlocking does not work (either the latch overshoots if the sensor fails open, or it will not move if the sensor fails shorted). The slave controller is capable of recognizing the sensor failure, correcting it, and sending the appropriate feedback to the Master controller.

The feedback may consist of sending a number of pulses on the feedback line to indicate the specific failure and the current security device's position.

In case of both position sensor failures, several different algorithms could be implemented. If both sensors fail, the latch could change its position from unlocked to locked, or vice versa, by implementing a five second motor control pulses and ignoring the sensors. It is desirable though, to stop the operation of the security device, since the reason for failure is unknown, and the latch position cannot be positively confirmed, and therefore, the device could become permanently damaged.

The software control algorithm in the Master Controller 9 may choose to continue operating the slave locks in case of the position sensor failure, or it may disable it until the problem is fixed. The choice may be given to an end customer, to select the failure response mode using the PC software program which communicates with the Master Controller via the communication link.

Figure 7:
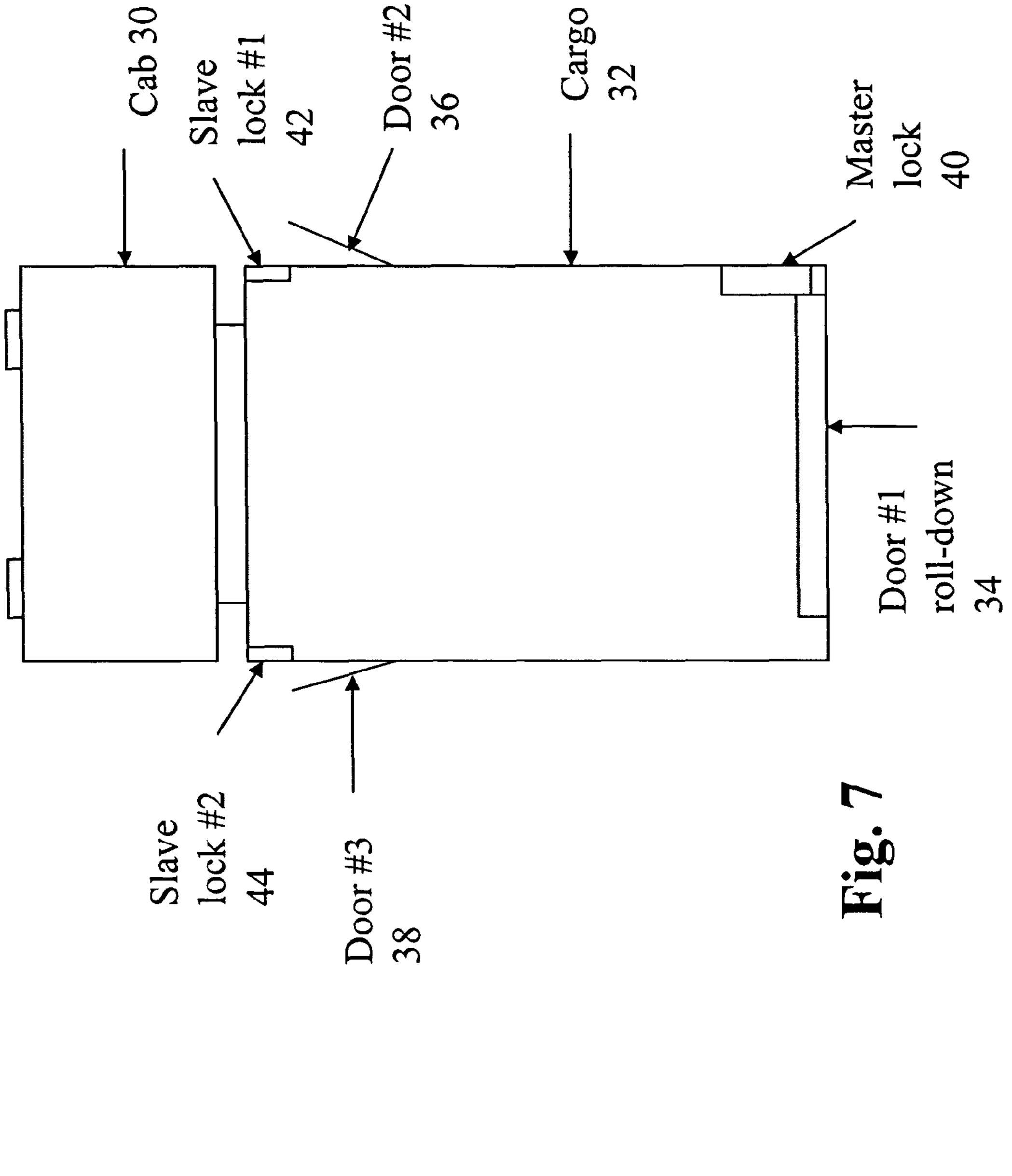
FIG. 7 represents an environmental drawing showing a preferred placement of various components of the security system in a cargo container.

FIG. 7 shows a top view of a preferred embodiment. It shows a cab 30, cargo container 32 roll down door 34 and swing out side doors 36 and 38, a master lock 40 placed in proximity to the roll down door 34 and slave locks 42 and 44 in proximity to swing out side doors 36 and 38. These components are strategically placed for optimal results in one application.

Those skilled in the art will recognize that a wide variety of modifications, alterations and combinations can be made with respect to the above described embodiments without departing from the spirit and scope of the invention, and that such modifications etc. are to be viewed as being within the ambit of this invention.

The invention claimed is:

1. A multiple lock cargo security system, comprising:

a master security device configured to be located in proximity to a first door having a first door opening in a cargo trailer, including master position sensors, a master motor, a master door sensor and a master latch, wherein the master position sensors are configured to determine whether the master latch is in a locked or unlocked position and are located internal to the master security device, and wherein the master door sensor is configured to confirm whether the first door is closed before sending a signal to the master motor to move the master latch to the locked position, and wherein the master door sensor is located in the master security device and is positioned in proximity to the master latch;

a master controller connected to the master position sensors and the master door sensor; at least one slave security device configured to be located in proximity to a second door having a second door opening in the cargo trailer, including slave position sensors, a slave motor, a slave door sensor, a slave latch and a slave controller connected to the master controller via a communication interface, wherein the slave position sensors are configured to determine whether the slave latch is in a locked or unlocked position and is located internal to the slave security device, and wherein the slave door sensor is configured to confirm whether the second door is closed before sending a signal to the slave motor to move the slave latch to the locked position, and wherein the slave door sensor is located in the slave security device and is positioned in proximity to the slave latch;

the communication interface is configured to provide control signaling to the slave controller from the master controller; and a signal generation device for communicating with the master controller through a wireless communication link, to move at least one of the master and slave latches to a locked or unlocked position; and wherein the slave controller is fully integrated within the slave security device, and the slave controller includes a short locking pulse before each unlocking motor drive signal, when moving from the locked to the unlocked position, and a short unlocking pulse before each locking motor drive signal, when moving from the unlocked to the locked position, and the duration of these short pulses is variable depending on measured temperature.

2. The multiple lock cargo security system of claim 1, wherein the master controller includes: a microcontroller, input and output interfaces, and the communication interface comprising at least a three-conductor communication interface configured to provide control signaling, feedback, temperature and door position information.

3. The multiple lock cargo security system of claim 1, wherein the master controller is connected to a plurality of slave controllers with communication interface, the communication interface being configured to provide control signaling, feedback, temperature and door position information.

4. The multiple lock cargo security system of claim 1, wherein the master controller includes: a microcontroller, a real-time clock, a power management circuit, input and output interfaces, a communication interface comprising a transceiver for use with a key-fob, a temperature sensor, and an external event memory.

5. The multiple lock cargo security system of claim 1, wherein the master controller actuates at least one slave latch.

6. The multiple lock cargo security system of claim 1, wherein at least one slave controller is independently controllable.

7. The multiple lock cargo security system of claim 1, wherein the master controller controls the charging of a system backup battery, if the main power source voltage meets an appropriate threshold.

8. The multiple lock cargo security system of claim 1, wherein the master controller actuates the slave controller through the communication interface via a wiring harness including a three-wire communication interface configured to provide control, feedback and temperature and door position information.

9. The multiple lock cargo security system of claim 1, wherein the security device includes at least one slave lock, and an independent temperature measuring device and a door position sensing mechanism for recording the time of when the door has been opened or closed.

10. The multiple lock cargo security system of claim 1, further comprising an alarm system to indicate malfunctions of the lock or position sensors, or an out of tolerance condition, and solution how to operate the security system without sensors.

11. A multiple lock cargo security system, comprising:

a master security device configured to be located in proximity to a first door having a first door opening in a cargo trailer, including master position sensors, a master motor, a master door sensor and a master latch, wherein the master position sensors are configured to determine whether the master latch is in a locked or unlocked position and are located internal to the master security device, and wherein the master door sensor is configured to confirm whether the first door is closed before sending a signal to the master motor to move the master latch to the locked position, and wherein the master door sensor is located in the master security device and is positioned in proximity to the master latch;

a master controller connected to the master position sensors and the master door sensor; at least one slave security device configured to be located in proximity to a second door having a second door opening in the cargo trailer, including slave position sensors, a slave motor, a slave door sensor, a slave latch and a slave controller connected to the master controller via a communication interface, wherein the slave position sensors are configured to determine whether the slave latch is in a locked or unlocked position and is located internal to the slave security device, and wherein the slave door sensor is configured to confirm whether the second door is closed before sending a signal to the slave motor to move the slave latch to the locked position, and wherein the slave door sensor is located in the slave security device and is positioned in proximity to the slave latch; the communication interface being configured to provide control signaling to the slave controller from the master controller; and a key fob comprising a signal generation device for communicating with the master controller through a wireless communication link, to move at least one of the master and slave latches to a locked or unlocked position;

wherein the slave controller is fully integrated within the slave security device, and the slave controller includes a short locking pulse before each unlocking motor drive signal, when moving from the locked to the unlocked position, and a short unlocking pulse before each locking motor drive signal, when moving from the unlocked to the locked position, and the duration of these short pulses is variable depending on measured temperature.

12. The multiple lock cargo security system of claim 11, wherein the master controller includes: a microcontroller, a real-time clock, a power management circuit, input and output interfaces, a communication interface comprising a transceiver for use with a key-fob, a temperature sensor, and an external event memory.

13. A multiple lock cargo security system, comprising:

a master security device configured to be located in proximity to a first door having a first door opening in a cargo trailer, including master position sensors, a master motor, a master door sensor and a master latch, wherein the master position sensors are configured to determine whether the master latch is in a locked or unlocked position and are located internal to the master security device, and wherein the master door sensor is configured to confirm whether the first door is closed before sending a signal to the master motor to move the master latch to the locked position, and wherein the master door sensor is located in the master security device and is positioned in proximity to the master latch; a master controller connected to the master position sensors and the master door sensor; at least one slave security device configured to be located in proximity to a second door having a second door opening in the cargo trailer, including slave position sensors, a slave motor, a slave door sensor, a slave latch and a slave controller connected to the master controller via a communication interface, wherein the slave position sensors are configured to determine whether the slave latch is in a locked or unlocked position and is located internal to the slave security device, and wherein the slave door sensor is configured to confirm whether the second door is closed before sending a signal to the slave motor to move the slave latch to the locked position, and wherein the slave door sensor is located in the slave security device and is positioned in proximity to the slave latch; the communication interface being configured to provide control signaling to the slave controller from the master controller; and a key fob comprising a signal generation device for communicating with the master controller through a wireless communication link, to move the master and slave latches to a locked or unlocked position;

wherein the slave controller is fully integrated within the slave security device, and the slave controller includes a short locking pulse before each unlocking motor drive signal, when moving from the locked to the unlocked position, and a short unlocking pulse before each locking motor drive signal, when moving from the unlocked to the locked position, and the duration of these short pulses is variable depending on measured temperature.

14. The multiple lock cargo security system of claim 13, wherein the security device includes at least one slave lock, and an independent temperature sensor and a door position sensing mechanism for recording the time of when the door has been opened or closed.

15. The multiple lock cargo security system of claim 13, wherein the master controller includes: a microcontroller, a real-time clock, a power management circuit, input and output interfaces, a communication interface comprising a transceiver for use with a key-fob, a temperature sensor, and an external event memory.

16. The multiple lock cargo security system of claim 13, wherein the master controller is positioned in proximity to a rear door in a container and slave controllers are positioned in proximity to side doors in a container.

* * * * *